Dec. 20, 1938.    W. E. MITTON    2,141,089
APPARATUS FOR STERILIZING FOOD PRODUCTS
Filed Oct. 21, 1935    6 Sheets-Sheet 1

Inventor
W. E. Mitton
Attorney

Dec. 20, 1938.     W. E. MITTON     2,141,089
APPARATUS FOR STERILIZING FOOD PRODUCTS
Filed Oct. 21, 1935     6 Sheets-Sheet 3

Dec. 20, 1938.   W. E. MITTON   2,141,089
APPARATUS FOR STERILIZING FOOD PRODUCTS
Filed Oct. 21, 1935   6 Sheets—Sheet 4
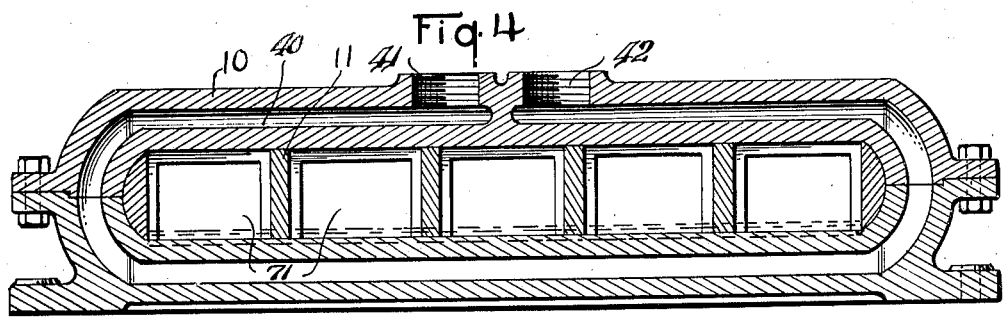
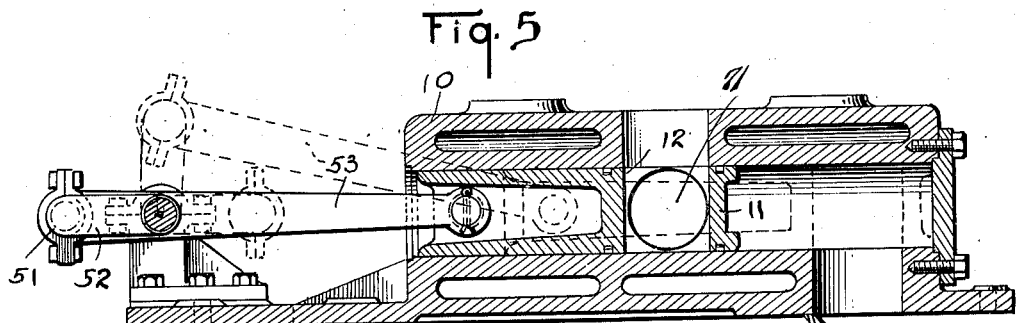
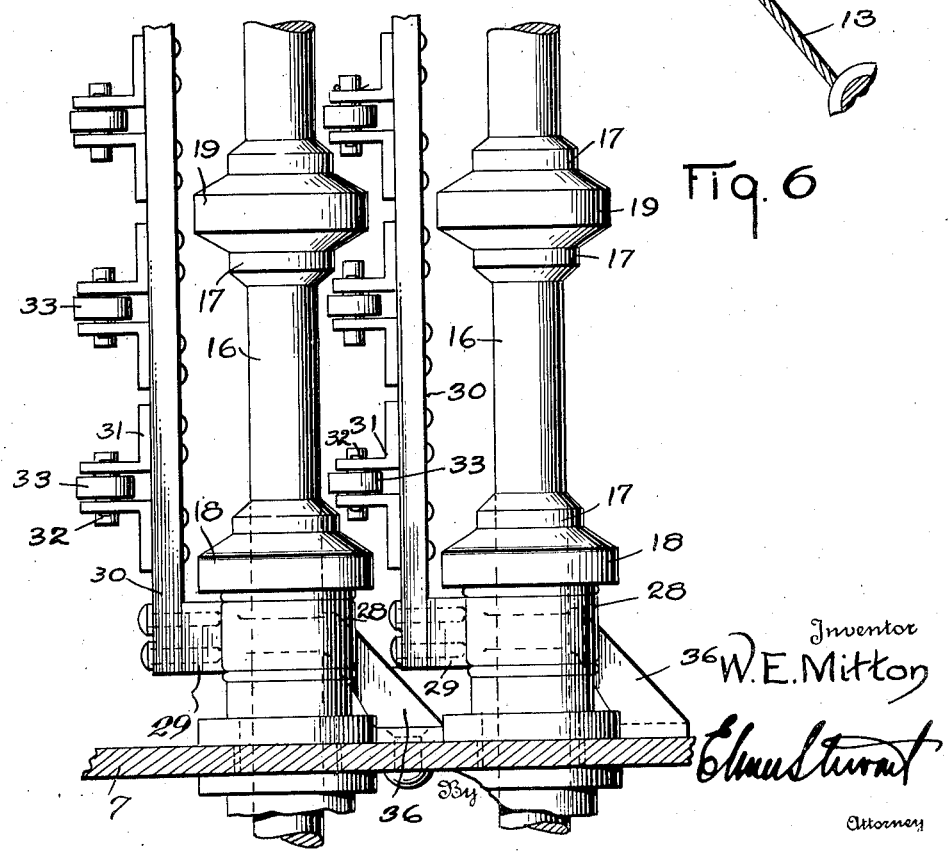
Inventor
W. E. Mitton
By Elmer Stewart
Attorney

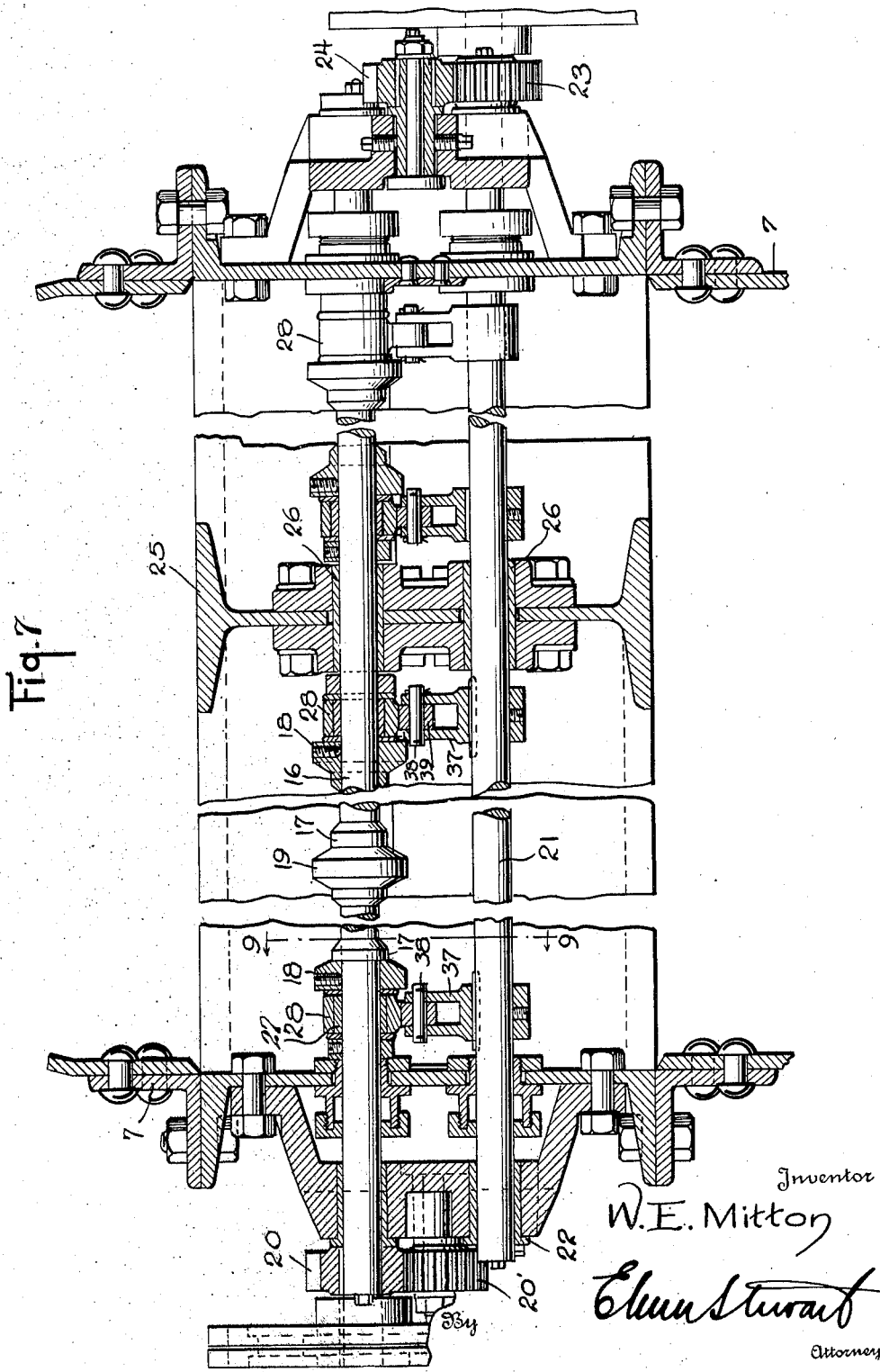

Dec. 20, 1938.  W. E. MITTON  2,141,089
APPARATUS FOR STERILIZING FOOD PRODUCTS
Filed Oct. 21, 1935   6 Sheets-Sheet 6
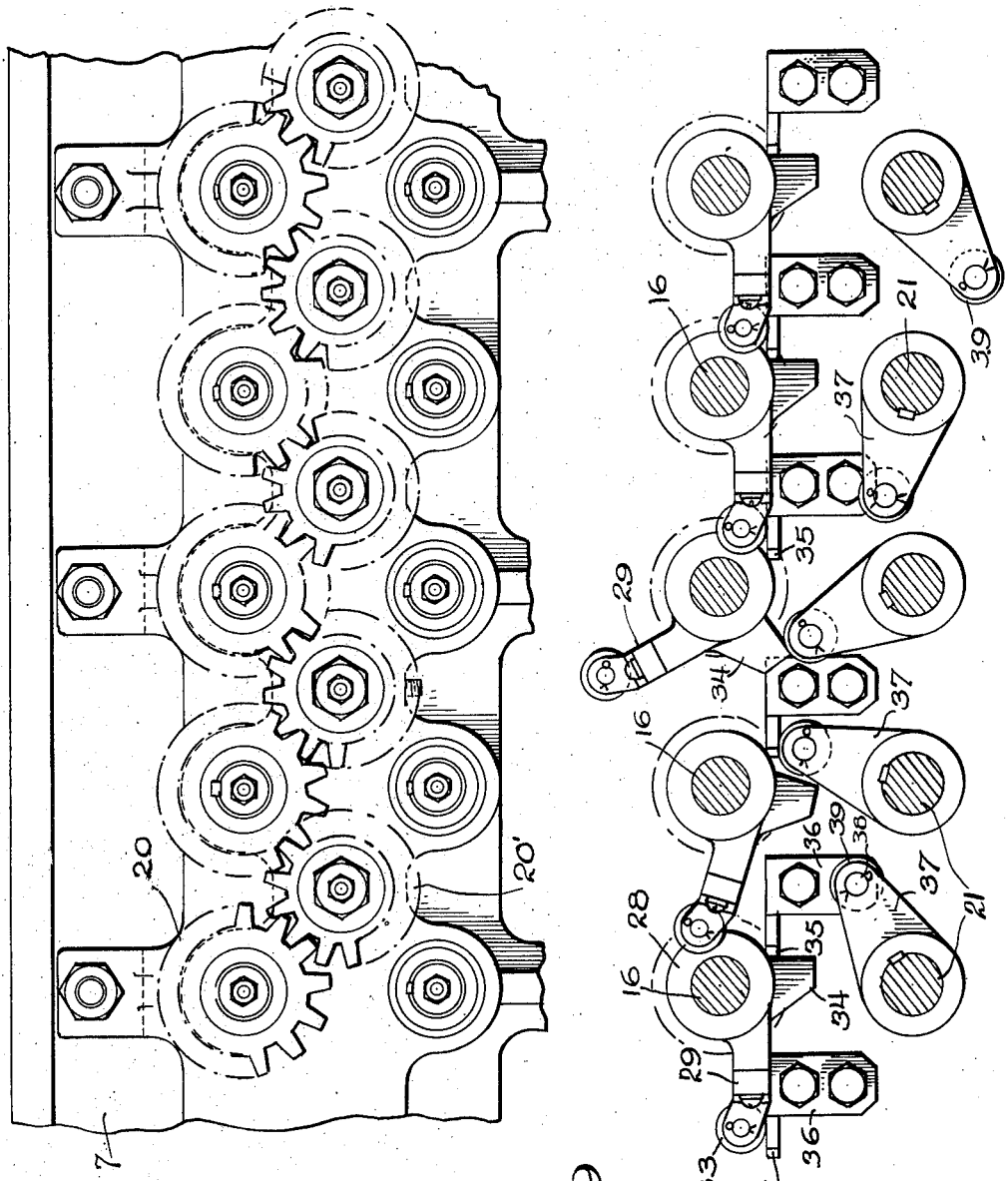

Patented Dec. 20, 1938

2,141,089

UNITED STATES PATENT OFFICE 2,141,089

APPARATUS FOR STERILIZING FOOD PRODUCTS

William E. Mitton, Shawano, Wis.

Application October 21, 1935, Serial No. 46,013

9 Claims. (Cl. 126—272)

The invention to which the following description relates is that of a novel and improved apparatus for sterilizing food products or the like where already packaged in cans.

The problem of properly preserving canned food products such as milk, vegetables or the like depends upon effectively sterilizing the canned products after packing and yet without imparting to these products any undesirable taste, color or other detrimental property. In particular, it has been found to be most difficult to sterilize evaporated milk in cans without producing a noticeable cooked flavor. The operation of sterilizing milk is quite critical. The temperature must be raised uniformly throughout the mass of the liquid but there is great risk of the heat overtreating part of the material before the remainder of the material is effectively sterilized.

The evaporated milk is first filled into cans that are then sealed. These cans are then carried rapidly through a sterilizing chamber in which the contents are quickly and uniformly brought up to a momentary temperature of 260° F. In carrying out this operation the cans are maintained under constant vigorous agitation so that all parts of the contents are brought into contact with the heated walls of the cans. This also prevents any portion of the milk being overtreated. Following sterilization the cans are then cooled as rapidly as possible back to normal temperatures and pressures.

The preferred improved means by which the sterilizing and cooling steps are carried out are set out in full in the following description.

Where the milk is contained in the small cylindrical cans most in demand in trade, the uniform treatment of all the cans requires apparatus which must be positive in operation and certain in its results. It has been found for example, that efforts to pass these cans separately and individually through a zone of treatment by means of a belt conveyer or the like is open to objection since the individual cans are hard to control in their movements and may even lag in their course of treatment so that they get more heat than is intended. This degree of heat may be such as to over-heat some of the cans and thus damage the product.

A considerable factor in the proper treatment of canned milk is to accomplish a uniform penetration of heat throughout the material in the can. As there is little or no vacant space in the filled can, the contents are difficult to agitate and it is quite a problem to bring all the material uniformly into proximity with the walls of the can through which the heat must be conducted.

One of the objects of this invention is to subject a large number of identical cans to heat or cold in such a manner that the contents of the cans are agitated and brought into heat-absorbing proximity with the walls of the can in the minimum time.

It is a further object of the invention to insure each can getting identically the same heat treatment as every other can by subjecting the individual cans to predetermined mechanical movements which advance the cans through the zone of treatment intermittently and without interruption of the agitating movement by which the contents of the cans are being uniformly subjected to heat.

One of the objects of my invention is to apply this process of heat treatment to a large quantity of receptacles such as cans, with the minimum of required mechanical effort. With respect to the novel apparatus forming part of my invention, means are provided for advancing, shifting or moving the individual cans in accordance with the desired sequence and timing.

In order that the individual cans shall be directly subject to the influence of the heating or cooling fluids, the cans are supported by novel means which expose a maximum area of the cans to the treating fluids.

The novel apparatus is designed in such a way as to permit the desired operation of heat treating to be carried out with any selected number of cans. In this way the treatment applied through the operation of the machine is entirely independent of the load placed upon the apparatus. For example, only a single series of cans may be passed through the apparatus and subjected to uniform treatment. However, this series may be multiplied up to the capacity of the machine with the assurance that every series of cans will receive the same uniform treatment as though it were the only series being treated.

As illustrating the preferred form of apparatus, I have shown in the attached drawings a complete arrangement of devices for sterilizing and cooling cans of evaporated milk. In these drawings Fig. 1 is a side elevation of a treating machine embodying the invention showing the sterilizer and a part of the cooler;

Fig. 4 is a vertical transverse section on line

Figure 2:
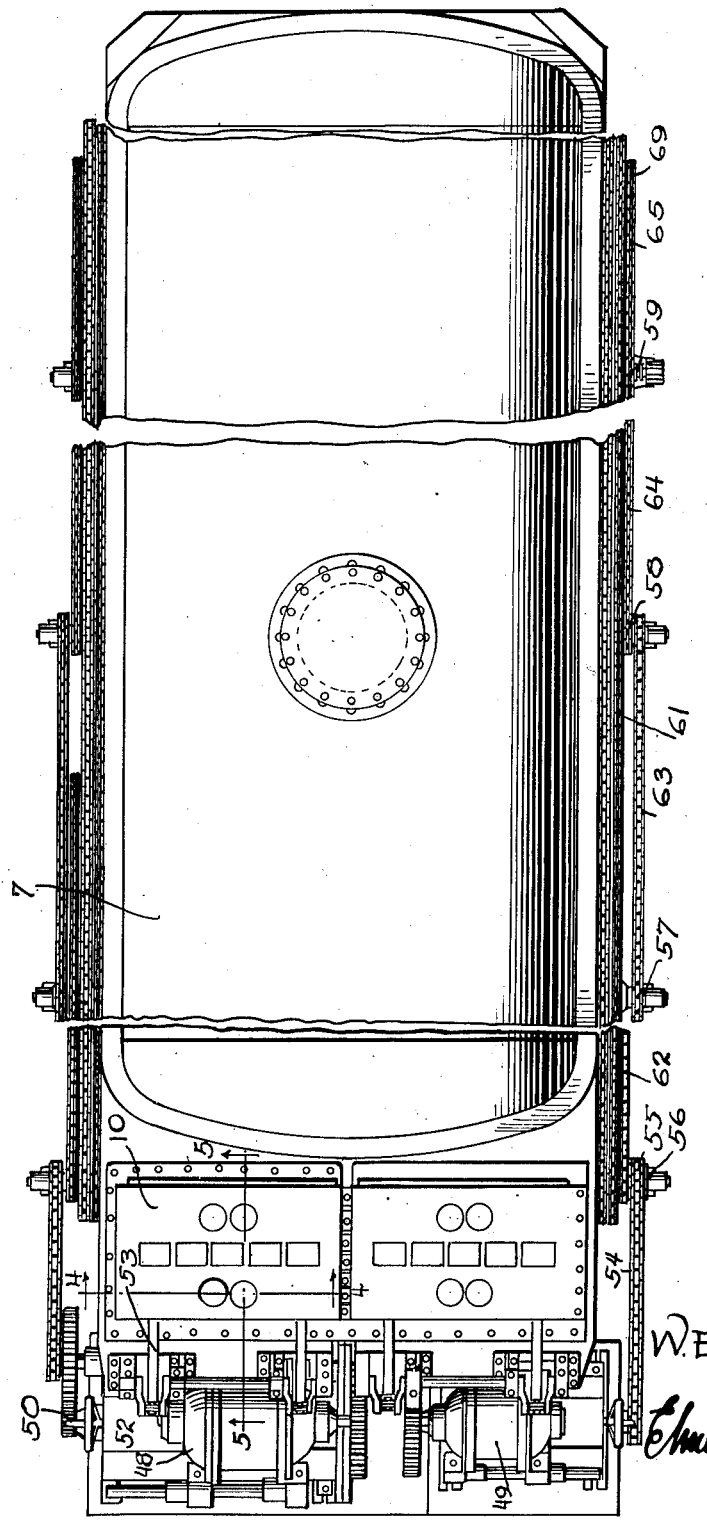
Fig. 2 is a plan view of the sterilizer.
Figure 3:
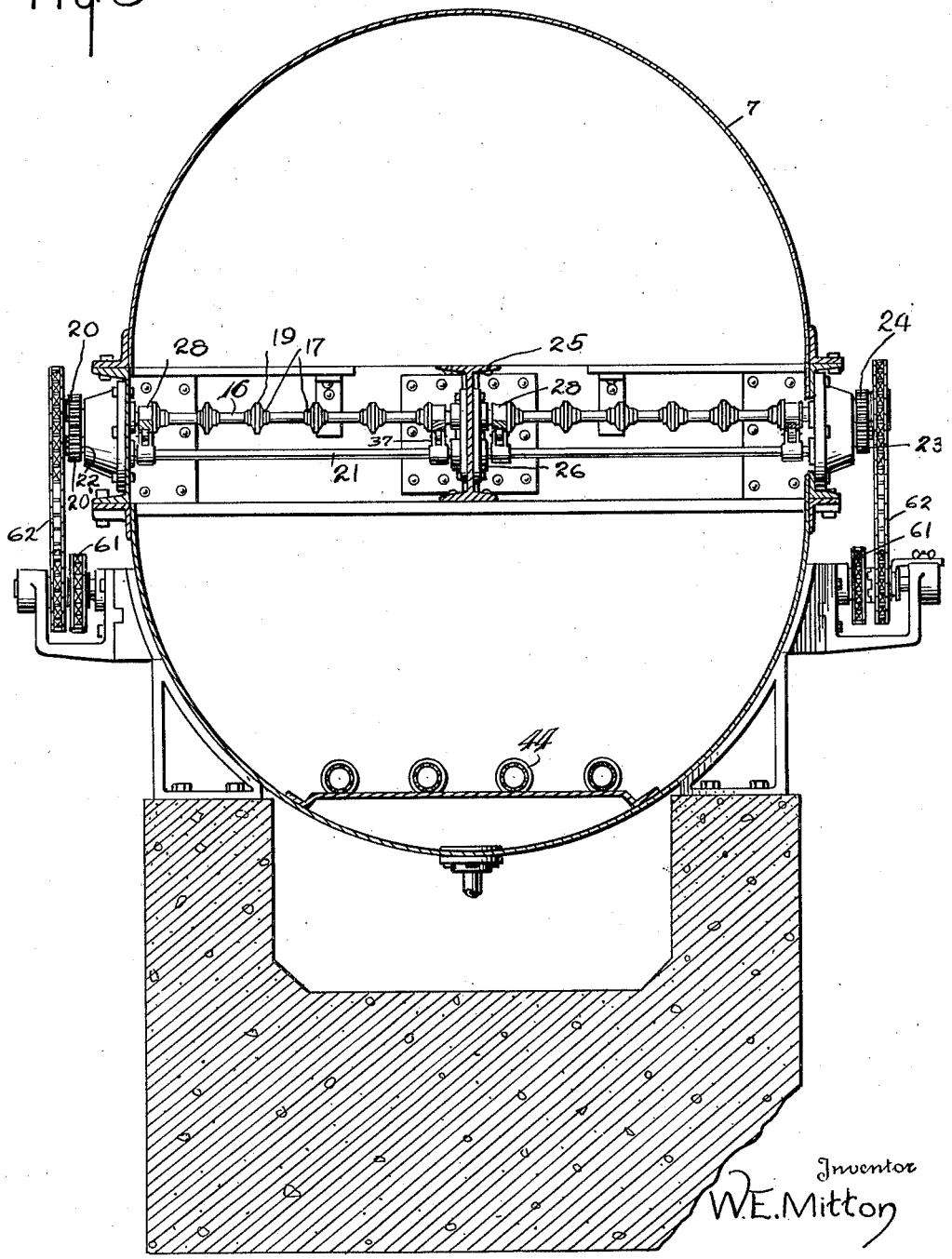
Fig. 3 is a vertical transverse section on the line 3—3 of Fig. 1.

4—4 of Fig. 2, of one of the valves for can-feeding and delivering mechanisms;

Fig. 5 is a vertical longitudinal section on the line 5—5 of Fig. 2;

Fig. 6 is a fragmentary detail plan view of the can advancing mechanism;

Fig. 7 is an enlarged vertical transverse section of the advancing mechanism shown in Fig. 3;

Fig. 8 is an enlarged fragmentary side elevation of the advancing gearing and

Fig. 9 is an enlarged side elevation, partly in section on the line 9—9 of Fig. 7, showing the steps in the movement of the advancing mechanism.

Figure 1:
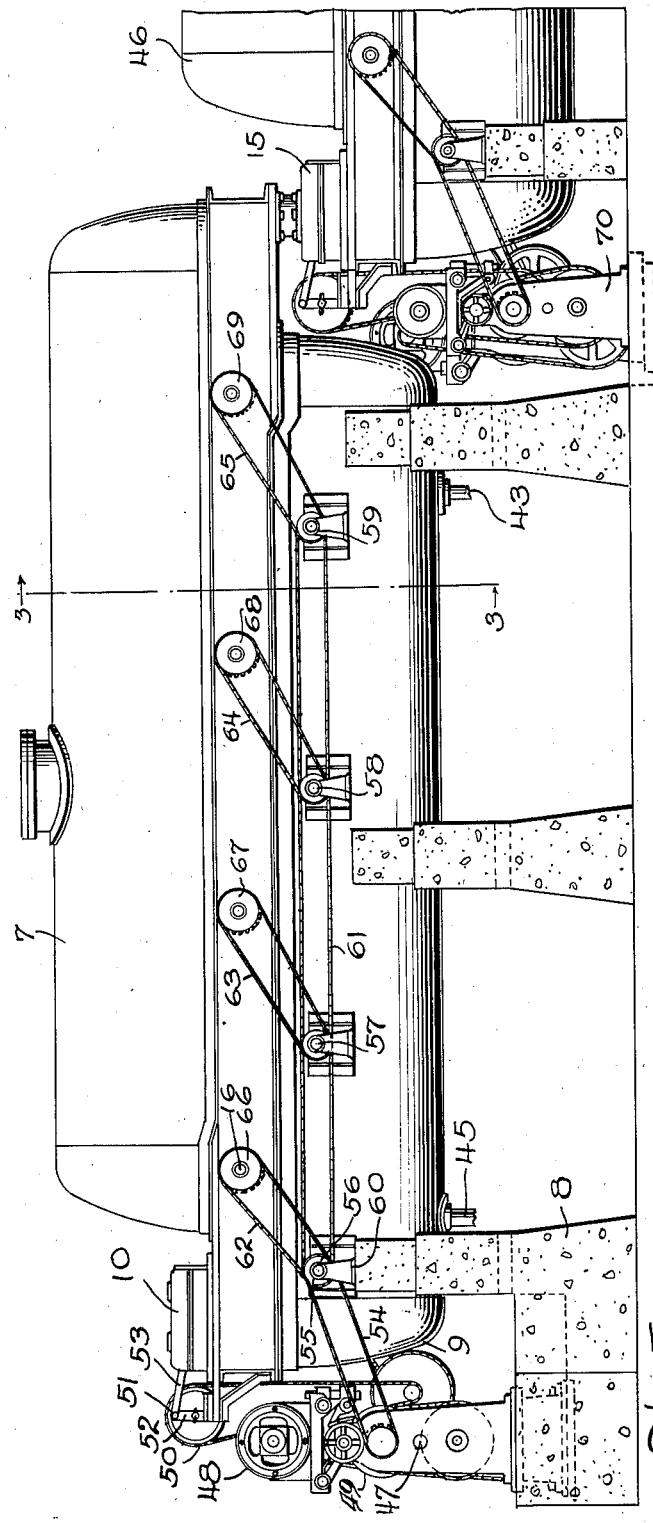

In Fig. 1 there is shown an assembly of a sterilizer and a cooler interconnected by a pocketed transfer device by which the pressure in each treating stage or step may be maintained under control. The cans are fed to the sterilizer through a similar transfer device capable of preventing the loss of pressure in the sterilizer compartment. In like manner, a transfer device discharges the completely cooled cans from the cooling device without loss of pressure in the latter. In this way the pressure existing inside and outside of the cans may be brought within sufficient balance to prevent internal stresses. It follows that the cans are thus fortified against rupture during the sterilizing treatment and this protection is maintained until the effect of the cooling stage reduces the internal pressure to normal and thus enables the completely treated cans to be discharged from the machine into the atmosphere without risk of damage.

The sterilizer consists of a generally cylindrical chamber 7 capable of withstanding the superatmospheric pressure desired to equalize the pressure resulting within the cans during the sterilizing operation. The chamber is mounted upon any suitable form of supports 8 and with the longitudinal axis of the chamber substantially horizontal. The head 9 of the chamber has extending entirely across it transfer devices 10 each of which includes a combined slide valve and air lock 11. This valve has a series of pockets 12, each of which is suitable for receiving and transferring one of the filled cans which it is intended to sterilize.

The chamber 7 is substantially or part circular in cross-section as shown in Fig. 3 and the can-manipulating devices extend entirely across the width of the chamber. It is of course understood that there will result a plurality of identical series of heat treating runs for the cans. In Fig. 3 these have been shown to be ten in number. It follows that there will be a pocket 12 for each of the separate runs and in consequence the transfer devices will extend across the head 9 of the chamber over the full width of the runs.

Interiorly of the head 9 of the chamber there is a chute 13 inclined downwardly and receiving the cans from the pockets 12 of the transfer device. The opposite end of the chamber is similarly equipped with a discharge chute inclined downwardly from the horizontal plane of the sterilizing runs. This chute delivers to the pockets 12 in the slide portion of the transfer device 15. The transfer device 15 discharges to the cooling mechanism in exactly the same manner as the transfer device 10 feeds cans to the sterilizer.

Means for advancing the cans through the sterilizer and maintaining them in constant agitation includes a support in the form of a series of roller bars or shafts 16. These bars are arranged in a horizontal plane and suitably spaced so that they can support the series of cans as they pass over the rollers. In order to support the cans and maintain the latter in constant rotation around their longitudinal axes, the bars have flanges 17 of greater diameter than the bars. The end flanges 17 have ribs 18 along one side. The intermediate enlarged flanges 17 have ribs 19 centrally disposed with respect to the enlarged flanges 17. Thus the enlarged flanges 17 provide rolling supports of sufficient size to keep the cans rotating with the desired peripheral speed. At the same time the ribs 18 and 19 prevent the cans from moving out of their direct line of travel. From the form of enlarged flanges 17 and ribs 18 and 19 it follows that the cans are supported over the minimum amount of their area and thus a maximum of the peripheral area is free to be subjected to the heating or cooling agent.

In like manner where an agent is used of greater degree of heat than the contents of the can can stand without damage, there is less prospect of this excessive heat being imparted from the minimum contact of the flanges 17.

One or both ends of the shafts 16 extend through the side walls of the chamber in bearings or packings which withstand the internal pressure. The extending ends of the shafts carry a series of gears 20 so arranged with intermediate gears 20' that the shafts 16 will all rotate in a common clockwise direction as indicated in the side view of Figs. 1 and 8. By reason of this form of drive the individual cans being processed, are caused to rotate in a counterclockwise direction on their longitudinal axes at a sufficient speed to vigorously agitate the contents and bring all parts of the latter momentarily into heat absorbing relation with the peripheral sides of the cans.

Suitable means are provided for advancing these cans successively over the series of shafts 16 or from the chute 13 to the delivery chute. One form of such actuating means is shown in Figs. 6, 7 and 9 where a series of transverse horizontal shafts 21 is provided below the individual shafts 16, 16. The shafts 21 are journalled in pressure-withstanding bearings 22 in the chamber 7 as shown in Fig. 7. One end of each of such shafts carries gear 23 and these gears are connected to intermediate gears 24 by which the gears 23 and the shafts 21 are constrained to rotate in a counterclockwise direction as seen in Fig. 9.

As shown in Figs. 3 and 7, there is a longitudinal partition running vertically in the chamber 7. This forms intermediate bearings 26, 26 for the shafts 16 and 21 as more particularly shown in Fig. 7. On each side of the partition 25 the shaft 16 carries a group of five can supporting elements formed by the flanges 17, 18 and 19. Outwardly of the flanges 18, that is on the sides opposite from the flanges 17, the shaft 16 carries two journals 27 for loose collars 28.

These collars 28 have radial arms 29 as indicated in Fig. 9. The arms at opposite ends of each shaft are connected by a bar 30, see Fig. 6. This bar is parallel to shaft 16 and beyond the flanges 18 and 19. Bar 30 carries pairs of brackets 31, in the form illustrated, two pairs for each can run or for each pair of opposed flanges 17. Pins 32 are mounted upon each pair of brackets 31 and form a loose shaft for a loose roller 33.

Collars 28 each have a boss 34 extending radially and at an angle to the arms 29. These bosses normally extend vertically downward from the shafts 16.

The arms 29 normally extend horizontally as shown in the position shown at the extreme left in Fig. 9 by reason of the boss 34 striking the front edge of a stop 35. This stop extends inwardly from a bracket 36 on the side wall of the chamber 7.

There is a shaft 21 spaced below each shaft 16 and operating in a counter clockwise direction. Each shaft 21 has an arm 37 extending radially outwardly beneath one of the collars 28. The arms 37 are divided to form a yoke carrying a pin 38. A loose roller 39 is mounted on each pin 38 and proportioned to strike against the vertical side of the boss 34.

The arms 37 on successive shafts 21 are angularly disposed each to the other and in sequence. As shown in Fig. 9 there are successive variations in position or in other words, the arms are disposed at successively differing angles to operate in sequence. In this way the rollers 33 are caused to rise successively and advance the can from a position at the left of the middle shaft 16 to a similar position between that shaft and the one on the right. Assuming the advancing movement to occur at the middle shaft 16 of Fig. 9, the roller 39 will then roll beyond boss 34 and permit the latter to fall back against the stop 35 with the arm 29 in the horizontal position.

The space between the second shaft 16 from the left and the middle one is now vacant and the arm of shaft 21, second from the left, comes into engagement with stop 34 and causes the delivery of a can from the space between the first and second shaft 16 to the already vacated space between the second and third shafts 16. As soon as the collars 28 drop back with the bosses 34 against stops 35 the vacant space between the first and second shaft 16 receives a can from the space at the left of the first shaft 16.

The cans are thus advanced in successive waves separated by periods of no advance represented by the time interval during which the arms 37 rotate out of engagement with the advancing mechanism.

The transfer device 10 is adapted to be used as a pre-heater. For this purpose it is provided with a steam jacket 40 through which steam or other hot fluid is admitted through inlet 41 and withdrawn through outlets 42.

The sterilizer itself is also heated with live steam admitted through inlet 43. This steam passes through radiator 44 and may be discharged into the sterilizer from the radiator by perforations in the latter, not illustrated. In the latter event condensation is drained through outlet 45.

A transfer device 15 at the discharge end of the sterilizer receives the sterilized cans from the end of the series of agitating and conveying devices. Both this and the transfer device 10 are adapted to operate without permitting loss of pressure from the sterilizer 7. The type of slide valve transfer will form a compression lock for this purpose.

From the transfer device 15 the sterilized cans, still under pressure and at considerable temperature are discharged into the cooler 46. This cooler is in every material respect, similar to the sterilizer 7. It contains the same series of agitating shafts 16 and conveying devices 29. In this cooler the cans are agitated and cooled quite rapidly with consequent reduction of their internal pressure. It is, therefore, possible to discharge the cans from the cooler 46 by a transfer device similar to that shown at 15 so that the cooled cans come into the pressure of the atmosphere without having been subjected to any swelling strains.

It is of course possible to substitute other types of agitators and conveyors in the cooling unit 46 and still accomplish the results above stated.

Power for the operation of the sterilizing mechanism is provided from a stand 47 with appropriate motive power 48, 49. Power is transmitted by belt 50 to a pulley 51. The shaft of the pulley 51 has a crank 52 connected to a link 53 by which a movable valve 11 is operated.

Power from the motor 49 is applied through belt 54 to a shaft 55. This shaft has a pulley 56. Similar shafts 57, 58 and 59 are mounted on brackets 60 on one side of the sterilizer. These shafts 55, 57 and 58 are driven by a belt 61. Power from the shafts 55, 57, 58 and 59 drives a series of belts 62, 63, 64 and 65 which operate pulleys 66, 67, 68 and 69 on shafts 16. As previously stated shafts 16 carry gears 20 which by means of intermediate idle gears 20' are connected for simultaneous rotation.

Drive of the conveying devices is produced through gearing on the opposite side of the sterilizer applied from motor 48 by a similar train of equalizing belt, shafts 21 and intermediate gears. Other equivalent mechanical movements to accomplish these results, can of course be substituted.

A similar power stand 70 with its associated parts is mounted to operate the transfer device 15 and the agitators and conveyors in the cooler 46.

It is to be understood that suitable means is applied to introduce and remove cooling fluid to and from the cooler 46.

The apparatus above described functions in a rapid and satisfactory manner. The cans fed through the transfer device are preheated either at that point or previously and then subjected to steam heat under more than the atmospheric pressure in the sterilizer 7. The pressure is sufficient to prevent the development of any bulging in the cans. The rapid rotation of the cans serves to make the heating uniform and without the risk of scorching the contents. The cans are advanced step by step through the length of the sterilizer and then discharged still under pressure through the transfer device 15 and into the cooler 46. Here the cans still under pressure rapidly cool uniformly throughout their contents and lose any tendency toward bulging or leakage. As delivered from the cooler 46 by a transfer device similar to the member 15, cans are in condition for convenient handling and further disposition.

I have illustrated the preferred form of my invention with the understanding that wide variation may be exercised in the selection of proportions, materials and mechanical movements.

What I claim as my invention is:

1. Apparatus for processing milk comprising a pressure sterilizing chamber, means for introducing steam into the chamber under pressure, means for feeding cans into the chamber without loss of pressure, a feed chute, means for dicharging cans from the chamber without loss of pressure, a discharge chute, a series of means in the chamber between said chutes for rotating the cans on their longitudinal axes, and means for advancing the cans step by step over the rotating means in succession.

2. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, a series of means in the chamber between said chutes for rotating the cans on their longitudinal axes, and means for advancing the cans step by step and in timed sequence over said rotating means in succession.

3. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, transverse rotary shafts arranged in a series extending between the chutes, means for rotating the shafts in a common direction, and means for advancing the cans step by step over said rotary shafts in succession.

4. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, transverse rotary shafts arranged in a series extending between the chutes, said shafts being flanged at intervals suitable for supporting each can on its opposite edges, means for rotating the shafts in a common direction and means for advancing the cans step by step over said rotary shafts in succession.

5. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, transverse rotary shafts arranged in a series extending between the chutes, said shafts being flanged at spaced points for supporting each can on its opposite edges, guide ribs on the flanges, means for rotating the shafts in a common direction and means for advancing the cans step by step over said rotary shafts in succession.

6. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, means in the chamber between said chutes for rotating the cans on their longitudinal axes, means for advancing the cans over the rotating means, a series of operating shafts spaced from the can-rotating means, gearing for driving said shafts in a common direction, and an arm carried by each said shaft for actuating the said can-advancing means.

7. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, means in the chamber between said chutes for rotating the cans on their longitudinal axes, means for advancing the cans over the rotating means, a series of operating shafts spaced from the can-rotating means, gearing for driving said shafts in a common direction, and an arm carried by each said shaft for actuating the said can-advancing means, the successive arms in the path of each can being spaced angularly from each other to advance the rotating cans in timed sequence.

8. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, transverse rotary shafts arranged in a series extending substantially horizontally between the chutes, means for rotating the shafts in a common direction, and means intermittently operable through the spaces between the transverse shafts to advance the cans step by step over the rotary shafts.

9. Apparatus for processing milk comprising a sterilizing chamber, means for introducing steam into the chamber under pressure, means for feeding cans into the chamber without loss of pressure, a feed chute within the chamber, means for discharging cans from the chamber without loss of pressure, a discharge chute, transverse rotary shafts arranged in a series extending substantially horizontally between the chutes, means for rotating the shafts in a common direction, and means intermittently oscillatable in a vertical direction through the spaces between the transverse shafts to advance the cans step by step over the rotary shafts.

WILLIAM E. MITTON.